US008838362B2

(12) United States Patent
Higgins et al.

(10) Patent No.: US 8,838,362 B2
(45) Date of Patent: Sep. 16, 2014

(54) LOW-DRAIN, SELF-CONTAINED MONITORING DEVICE

(75) Inventors: Christopher T. Higgins, Placentia, CA (US); James J. Richardson, Temecula, CA (US); Joseph C. Silva, Grand Terrace, CA (US)

(73) Assignee: Raytheon Company, Waltham, MA (US)

( * ) Notice: Subject to any disclaimer, the term of this patent is extended or adjusted under 35 U.S.C. 154(b) by 304 days.

(21) Appl. No.: 13/352,624

(22) Filed: Jan. 18, 2012

(65) Prior Publication Data

US 2012/0203441 A1 Aug. 9, 2012

Related U.S. Application Data

(60) Provisional application No. 61/439,191, filed on Feb. 3, 2011.

(51) Int. Cl.
*G01M 17/00* (2006.01)
*G07C 5/08* (2006.01)
*G07C 5/00* (2006.01)

(52) U.S. Cl.
CPC .................................... *G07C 5/008* (2013.01); *G07C 5/0858* (2013.01)
USPC .......................... 701/102; 701/29.1; 701/33.2

(58) Field of Classification Search
CPC .......... G01G 23/163; G01G 23/37; G01J 5/08
USPC ....................................... 701/102, 29.1, 33.2
See application file for complete search history.

(56) References Cited

U.S. PATENT DOCUMENTS 4,902,956 A * 2/1990 Sloan ............................ 320/135
5,491,486 A * 2/1996 Welles et al. ............ 342/357.74
5,585,566 A 12/1996 Welles, II et al.
5,671,141 A 9/1997 Smith et al.
5,968,108 A * 10/1999 Takakura et al. ............ 701/102
6,094,609 A 7/2000 Arjomand
6,225,898 B1 5/2001 Kamiya et al.
6,295,492 B1 9/2001 Lang et al.
6,526,340 B1 2/2003 Reul et al.
6,529,808 B1 3/2003 Diem
6,604,033 B1 8/2003 Banet et al.
6,611,740 B2 8/2003 Lowrey et al.
6,636,790 B1 10/2003 Lightner et al.
6,732,031 B1 5/2004 Lightner et al.
6,807,469 B2 10/2004 Funkhouser et al.
6,832,141 B2 12/2004 Skeen et al.
6,879,894 B1 4/2005 Lightner et al.
6,925,368 B2 8/2005 Funkhouser et al.
6,928,349 B1 8/2005 Namaky et al.

(Continued)

*Primary Examiner* — Stephen K Cronin
*Assistant Examiner* — Joshua Campbell
(74) *Attorney, Agent, or Firm* — Daly, Crowley, Mofford & Durkee, LLP

(57) ABSTRACT

In one aspect, a vehicle monitoring apparatus includes an interface configured to connect to a diagnostic port of a vehicle, a processor coupled to the interface and configured to communicate with the diagnostic port and a sensor coupled to the processor and configured to detect a factor indicating the presence of a driver in the vehicle. The sensor causes the apparatus to transition from a first power mode to a second power mode upon detection of the factor. The apparatus draws more power from the vehicle in the second power mode than in the first power mode. The apparatus also includes a housing that includes the processor and the sensor.

32 Claims, 3 Drawing Sheets

(56) References Cited

U.S. PATENT DOCUMENTS

| | | | | |
|---|---|---|---|---|
| 6,988,033 | B1 | 1/2006 | Lowrey et al. | |
| 7,305,289 | B2 | 12/2007 | Gessner et al. | |
| 7,577,503 | B2 | 8/2009 | Bertosa et al. | |
| 2004/0143382 | A1 * | 7/2004 | Ishida | 701/36 |
| 2004/0215379 | A1 | 10/2004 | Pangerl et al. | |
| 2005/0073503 | A1 | 4/2005 | Fudali et al. | |
| 2005/0075768 | A1 | 4/2005 | Nicholson et al. | |
| 2005/0096809 | A1 * | 5/2005 | Skeen et al. | 701/29 |
| 2005/0146458 | A1 | 7/2005 | Carmichael et al. | |
| 2005/0251604 | A1 | 11/2005 | Gerig | |
| 2005/0273218 | A1 | 12/2005 | Breed et al. | |
| 2006/0167593 | A1 | 7/2006 | Eckles | |
| 2006/0289403 | A1 | 12/2006 | Jouanneau | |
| 2007/0010922 | A1 | 1/2007 | Buckley | |
| 2007/0073459 | A1 * | 3/2007 | Webster et al. | 701/29 |
| 2007/0073460 | A1 | 3/2007 | Bertosa et al. | |
| 2007/0083306 | A1 | 4/2007 | Comeau | |
| 2007/0142986 | A1 | 6/2007 | Alaous | |
| 2007/0276584 | A1 | 11/2007 | Veliu et al. | |
| 2008/0071440 | A1 * | 3/2008 | Patel et al. | 701/29 |
| 2008/0119981 | A1 | 5/2008 | Chen | |
| 2008/0122288 | A1 * | 5/2008 | Plante et al. | 307/10.1 |
| 2008/0133067 | A1 | 6/2008 | DeMay | |
| 2009/0005927 | A1 * | 1/2009 | Schlatre et al. | 701/30 |
| 2010/0087984 | A1 | 4/2010 | Joseph | |

* cited by examiner

LOW-DRAIN, SELF-CONTAINED MONITORING DEVICE

RELATED APPLICATIONS

This application claims priority to U.S. patent provisional application No. 61/439,191, entitled "LOW-DRAIN, SELF-CONTAINED MONITORING DEVICE," filed on Feb. 3, 2011, which is incorporated herein in its entirety.

BACKGROUND

Most recently manufactured vehicles have on-board diagnostic systems to collect data about the operation of various vehicular components. A typical vehicle diagnostic system may collect feedback from various sensors around the vehicle and also capture error codes output by components in need of repair. To give vehicle owners and service technicians access to this data, these vehicles typically have a standardized diagnostic port from which the data may be accessed. Diagnostic tools are available that connect to a vehicle's diagnostic port and download vehicle data for analysis. Traditionally, these diagnostic tools are used only by a repair technician when an owner brings in a vehicle for repair. In such a scenario, a technician may connect a diagnostic tool to the vehicle's diagnostic port, download the error codes, and make the necessary repairs. Recently, electronic devices have become available that are meant to remain connected to a vehicle's diagnostic port while the vehicle is operational, so as to collect real-time data about the vehicle. These devices either have their own power source or utilize the vehicle's own battery power by drawing it through the diagnostic port. In the case of the latter, if the device is left on the diagnostic port while the vehicle is off, the device will typically detrimentally drain the vehicle's battery, as vehicles typically provide battery power through the diagnostic port regardless of whether the vehicle is on or off. Further, after data collection, these real-time diagnostic devices typically must be physically connected to a computing device before the data can be analyzed or aggregated by a user. Devices that reduce power consumption and improve data analysis and aggregation are needed.

Many solutions to reduce power consumption of these diagnostic devices are known in the prior art. One such solution involves equipping the diagnostic device with a "watchdog" type system that periodically queries a vehicle's diagnostic port at adaptive intervals to determine if the vehicle is running. For example, the diagnostic device may enter into a low-power sleep state when the vehicle is turned off and periodically wake up and query the diagnostic port to determine if the vehicle is running, and if it is, remain awake. This solution, however, is not ideal, as the diagnostic device must unnecessarily wake up a great number of times, and thus draw an unnecessary amount of power from the vehicle's battery.

SUMMARY

In one aspect, a vehicle monitoring apparatus includes an interface configured to connect to a diagnostic port of a vehicle, a processor coupled to the interface and configured to communicate with the diagnostic port and a sensor coupled to the processor and configured to detect a factor indicating the presence of a driver in the vehicle. The sensor causes the apparatus to transition from a first power mode to a second power mode upon detection of the factor. The apparatus draws more power from the vehicle in the second power mode than in the first power mode. The apparatus also includes a housing that includes the processor and the sensor.

In another aspect, a method to monitor a vehicle using a self-contained monitoring apparatus coupled to a diagnostic port of the vehicle includes detecting, with a sensor in the monitoring apparatus, a factor indicating the presence of a driver in the vehicle, transitioning the monitoring apparatus, upon detection of the factor, from a first power mode to a second power mode and drawing, with the monitoring apparatus, a greater amount of power from the vehicle in the second power mode than in the first power mode.

In a further aspect, a vehicle monitoring apparatus includes an interface configured to connect to a diagnostic port of a vehicle, a processor coupled to the interface and configured to communicate with the diagnostic port and a sensor coupled to the processor and configured to detect a factor indicating that the vehicle is in motion. The sensor causes the apparatus to transition from a first power mode to a second power mode upon detection of the factor. The apparatus draws more power from the vehicle in the second power mode than in the first power mode. The apparatus also includes a housing that includes the processor and the sensor.

BRIEF DESCRIPTION OF THE DRAWINGS

A better understanding of the present invention will be realized from the detailed description that follows, taken in conjunction with the accompanying drawings, in which.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting.

Figure 1:
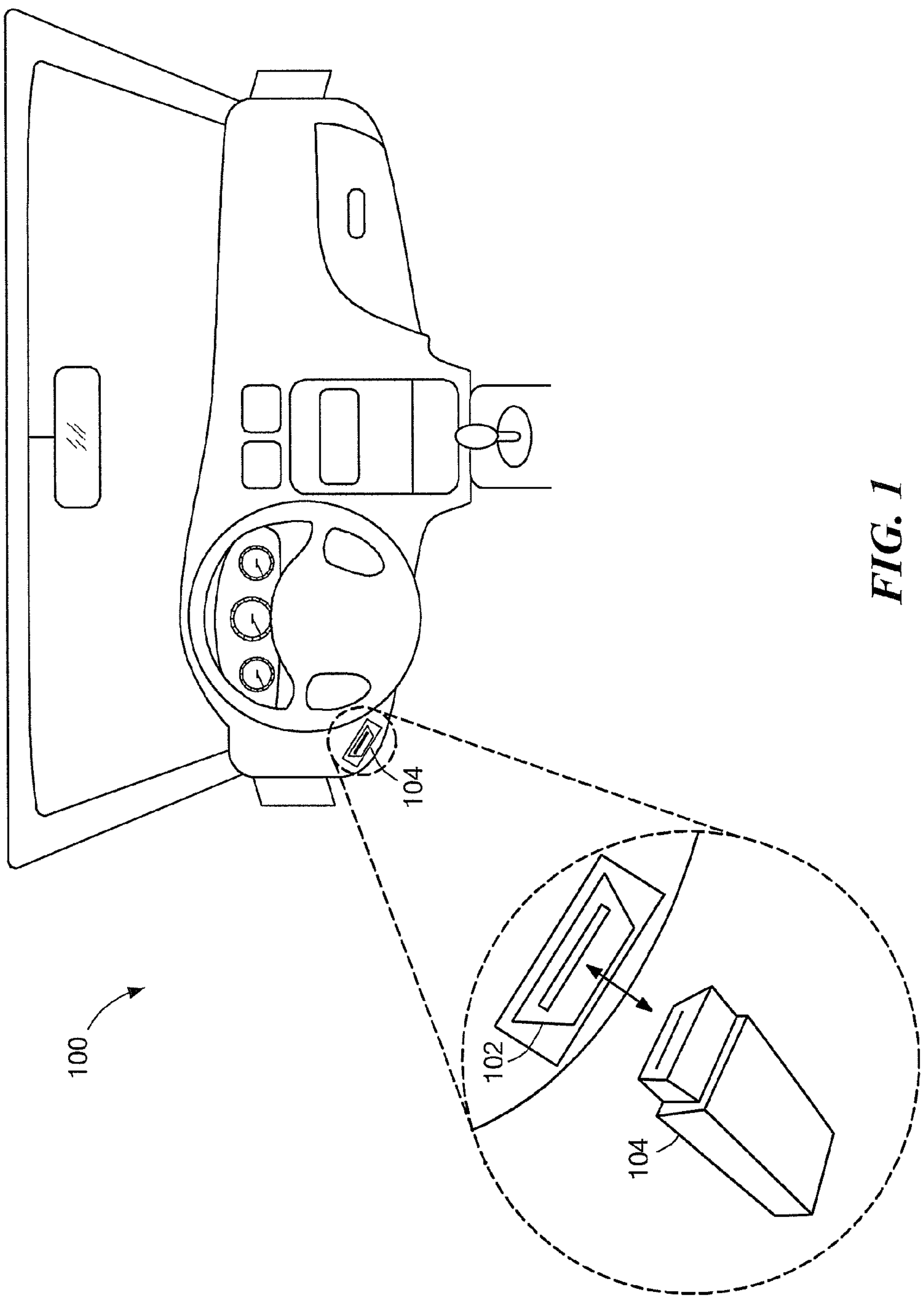
FIG. 1 is an illustration of a driver console of a vehicle with an enlarged view of a vehicle diagnostic port and a monitoring device.

FIG. 1 is an illustration of a driver console 100 of a vehicle with an enlarged view of a vehicle diagnostic port 102 and a monitoring device 104. The diagnostic port 102 is located on the driver's side of the console 100 underneath the dashboard and adjacent the steering wheel. In FIG. 1, the diagnostic port 102 is hidden from view and thus depicted with broken lines. In one embodiment, the diagnostic port is an Onboard Diagnostic Port II (OBD-II)—a standardized 16-pin female connector conforming to the SAE J1962 specification. Every car sold in the United States since 1996 is required to have an OBD-II connector. In general, various diagnostic data collected by a vehicle's diagnostic system is electronically available through a vehicle's OBD-II connector. However, the electronic signals passed through the OBD-II interface do not conform to one specification. There are three major signaling protocols currently used to expose data through the OBD-II interface: SAE J1850 PWM (Ford), SAE J1850 VPW (General Motors), and ISO 9141-2 (Chrysler and most foreign vehicles). Through these protocols, diagnostic port 102 exposes diagnostic information about various subsystems of a vehicle. For example, data such as vehicle speed, engine revolutions per minute (RPM), throttle position, emissions data, engine coolant temperature, intake air temperature, oxygen sensor voltage, fuel type, and fuel pressure are available through the diagnostic port 102. In other embodiments, additional or different vehicle data may be available through the diagnostic port 102. For example, the diagnostic port in hybrid vehicles may additionally expose data such as battery charge state, battery voltage, and electric motor speed in RPMs. Additionally, the diagnostic port 102 may provide power to a connected device by routing power from the vehicle's main battery. Further, diagnostic port 102 may alternatively conform to some other physical standard or be some other type of connector such as the Europe On-Board Diagnostics (EOBD) interface or the Japan On-Board Diagnostics (JOBD) interface.

The monitoring device 104 is a self-contained device configured to connect to the diagnostic port 102, which, in the current embodiment, is an OBD-II port. When coupled to diagnostic port 102, the monitoring device 104 has access to the vehicle diagnostic data exposed by the OBD-II protocol implemented by the vehicle maker. Further, the monitoring device 104 is designed to be semi-permanently coupled to the diagnostic port 102, such that, once it is connected, the device may remain connected while the vehicle is in use and also when the vehicle is idle. The monitoring device 104 may be disconnected, for example, for replacement or repair. During operation of the vehicle, the self-contained design of the monitoring device 104 allows for unobtrusive data collection.

Figure 2:
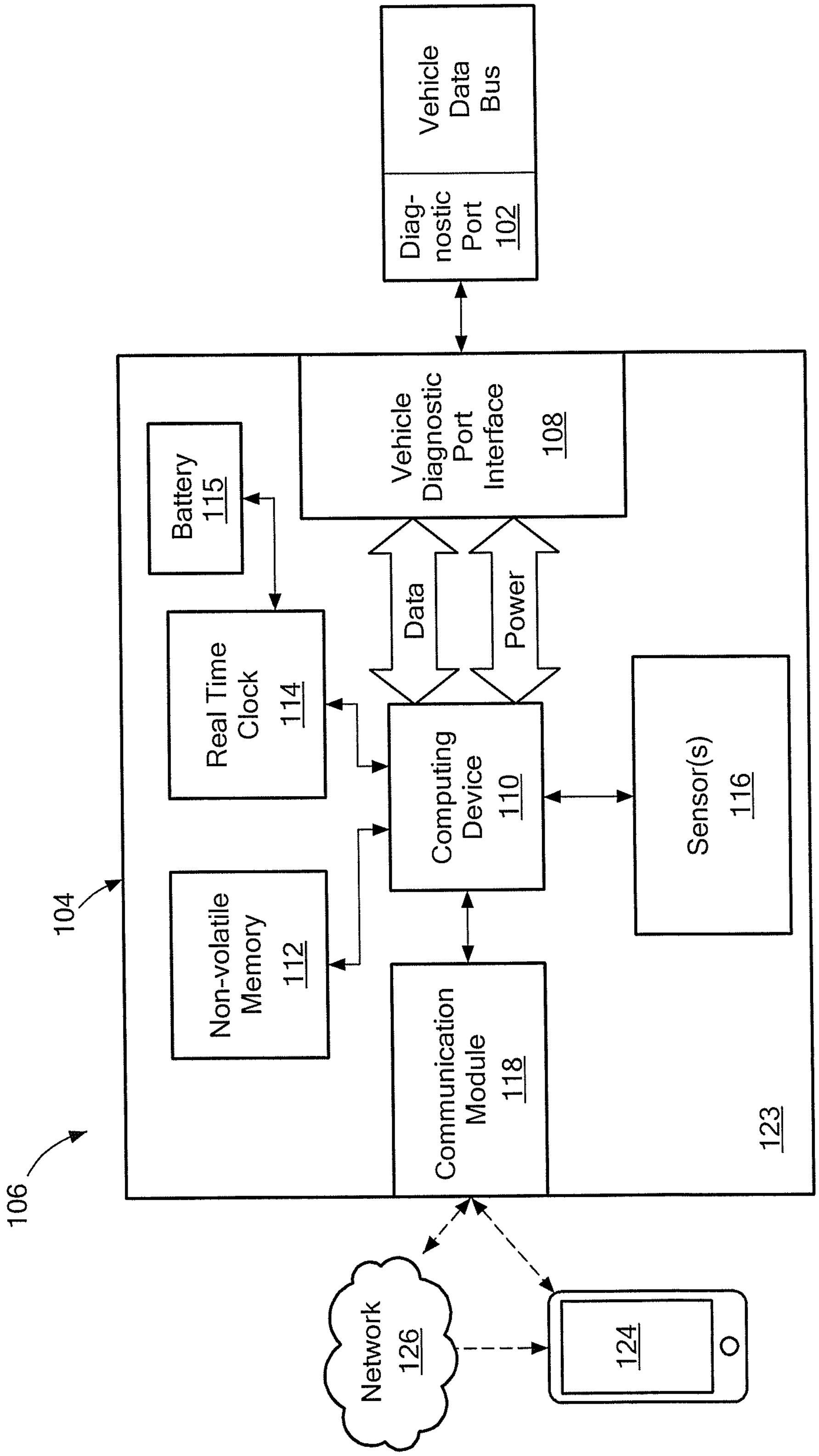
FIG. 2 is a functional block diagram of an exemplary embodiment of a monitoring system that includes the monitoring device of FIG. 1.

FIG. 2 is a functional block diagram of an exemplary embodiment of a monitoring system 106 that includes the monitoring device 104 of FIG. 1. Monitoring device 104 includes a vehicle diagnostic port interface 108. In the current embodiment, the interface 108 is a male version of the 16-pin OBD-II standard interface configured to connect to the diagnostic port 102 in the console 100. The pins in the interface 108 make electrical connections with the pins in the vehicle's diagnostic port 102 to facilitate data transfer as well as power transfer. Specifically, one of the pins in the interface 108 is configured to make an electrical connection to a corresponding pin in the diagnostic port 102 so as to transfer power from the vehicle's battery to the monitoring device 104. In alternative embodiments, the interface 108 may conform to a different physical connector standard, such as EOBD or JOBD.

The monitoring device 104 further includes a computing device 110. The computing device 110 may be an off-the-shelf microcontroller with an integrated processor core, memory, and programmable peripherals. Alternatively, computing device 110 may be a custom-made processor with proprietary components or it may be some other type of hardware and/or software solution configured to control monitoring device 104. The computing device 110 is coupled to the diagnostic port interface 108 such that data and power may be transferred between the two. Further, the computing device 110 is configured to execute computer-readable instructions stored on the embedded memory or on memory external to the computing device. Additionally, computing device 110 may be configured to execute instructions transmitted from remote computer systems.

The monitoring device 104 further includes non-volatile memory 112 that is coupled to computing device 110. The memory 112 is configured to store data regardless of whether the monitoring device 104 is connected to interface 108 (and thus drawing power) or not connected (and thus not drawing power). The memory 112 may be flash memory, a hard drive, or other volatile or non-volatile memory. Additionally, monitoring device 104 includes a real-time clock (RTC) 114 coupled to the computing device 110. Real-time clock 114 is configured to provide a non-volatile time source for computing device 110. In the current embodiment, real-time clock 114 draws its power from either the interface 108 or a battery 115. When the monitoring device 104 is connected to a vehicle and the vehicle is running, real-time clock 114 is powered through the interface 108, but when the device is disconnected from a vehicle or the vehicle is off, the real-time clock is powered by the battery 115 so it can continue to keep time. Further, in an alternative embodiment, real-time clock 114 may be integrated into the computing device 110.

The monitoring device 104 also includes one or more sensors 116 coupled to the computing device 110. In an exemplary embodiment, the sensor 116 is a low-power accelerometer. The accelerometer-based sensor 116 is configured to detect movement associated with the presence of a driver in a vehicle, such as vibrations produced by the vehicle door being opened or the driver taking his or her place in the driver's seat. When the monitoring device 104 is connected to a vehicle, the sensor 116 draws a negligible amount of power (e.g. less than about 1 mA) from the interface 108. In some embodiments, the accelerometer functionality of sensor 116 may also be configured to detect inertial events associated with operation of the vehicle such as an acceleration or deceleration. Alternatively, the monitoring device 104 may include multiple sensors and/or different types of low-power sensors. For example, sensor 116 may be a passive infrared (PIR) detector sensitive to the heat radiated by a human sitting in the driver's seat of the vehicle. Or, sensor 116 may be a motion-based sensor, such as a microwave sensor or a radar/lidar-based detector configured to detect motion associated with human presence in the vehicle. Additionally, sensor 116 may be an acoustic sensor configured to detect sounds associated with the vehicle's door being opened or other acoustic indicators associated with driver ingress. Further, sensor 116 may be a visual-based sensor such as a photodiode to detect changes in light conditions in the vehicle, a temperature sensor to detect rapid temperature changes in the vehicle, a pressure sensor to detect changes in pressure in the vehicle, a magnetism-based sensor configured to detect the magnetic field associated with a human, or any other type of low-power sensor configured to detect the presence of a driver in the vehicle.

In alternative embodiments, sensor 116 may be configured to detect other indications that the vehicle is in use, such as indications of vehicle motion. For example, sensor 116 may be an accelerometer optimized to detect when the vehicle is accelerating, or may be a low-power radar system to detect motion of the vehicle relative to the ground beneath it.

Further, in some embodiments, the sensors 116 may provide information to the monitoring system 106 (via the computing device 110) regarding vehicle operation, ambient readings, driver statistics, or other detected information. This information can include current temperature readings, acceleration or deceleration of the vehicle, in-car temperature, outside temperature, vehicle pressure and so forth.

The monitoring device 104 further includes a communication module 118 coupled to the computing device 110. In an exemplary embodiment, the communication module is a wireless Bluetooth standard interface, configured to both send and receive data with low-power radio waves. The communication module 118 is configured to wirelessly communicate with external devices in the general vicinity of the monitoring device 104. In alternative embodiments, communication module 118 may be configured to send and transmit data wirelessly over larger distances. For example, communication module 118 may be a cellular communication module configured to send and receive data over existing cellular networks. Or, communication module 118 may be an IEEE 802.11 WiFi module. Further, communication module 118 may include a combination of wireless modules so as to allow wireless communication over a multitude of networks. In further alternative embodiments, communication module may be a wire-based communication module, such as an Ethernet interface or a Universal Serial Bus (USB) interface.

In one embodiment, monitoring device 104 may also include a secondary vehicle diagnostic port interface. The secondary interface may be a female version of the 16-pin OBD-II standard interface configured to receive OBD-II based diagnostic tools, and may be coupled to the interface 108 via an OBD-II pass-through channel. The pass-through channel would route electronic signals from the interface 108 to the secondary interface so as to replicate a vehicle's OBD-II port. In other words, a traditional diagnostic tool may access the vehicle's data bus while the monitoring device 104 is connected to the vehicle's OBD-II port.

The components that comprise the monitoring device 104 are enclosed with a housing 123. The housing 123 encapsulates the diagnostic port interface 108, computing device 110, memory 112, real-time clock 114, battery 115, sensor(s) 116, and communication module 118, such that monitoring device 104 is an integrated, self-contained unit. In an alternative embodiment, the interfaces 108 and 120 may be external to the housing 123.

Further, in alternative embodiments, the monitoring device 104 may additionally include visual indicators on housing 123. For example, an LCD screen or one or more LEDs may be embedded into housing 123 and coupled to computing device 110. In such an embodiment, the visual indicators may be configured to display vehicle conditions or alert users to problems. Additionally, monitoring device 104 may include an auditory indicator to augment or in lieu of visual indicators. Finally, in some embodiments, the monitoring device 104 may include physical buttons on the face of the housing 123 configured to control various aspects of the device's operation.

In the monitoring system 106, monitoring device 104 is communicatively coupled to a communication device 124 via communication module 118. In the current embodiment, the communication device 124 is a smartphone, but in alternative embodiments it may be a PDA, tablet computer, standard PC, or other computing device. The communication device 124 and the monitoring device 104 communicate wirelessly over a bi-directional channel—in this case, a Bluetooth channel. Alternatively, the devices may communicate over a WiFi connection, a different type of wireless connection, or a wired connection such as Ethernet or USB. Further, in monitoring system 106, the monitoring device 104 may be coupled to a network 126 via communication module 118. Monitoring device 104 may wirelessly exchange data with network 126 over a cellular connection, WiFi connection, or other bi-directional channel. Additionally, communication device 124 is communicatively coupled to network 126 and monitoring device 104 may wirelessly exchange data with network 126 via communication device 124.

In operation, monitoring system 106 is a vehicle management hardware and software solution that provides (1) logging and diagnostic functionality, (2) remote vehicle communication functionality, and (3) remote vehicle configuration functionality. More specifically, in monitoring system 106, the monitoring device 104 connects to a vehicle's OBD-II port 102 and communicates with the vehicle's data bus to gather data about the vehicle's operation and health. The data logged by the monitoring device 104 may then be wirelessly communicated to the communication device 124 to be analyzed at the device and/or passed on to remote systems coupled to network 126. Or, the monitoring device 104 may transmit the data directly to network 126.

As mentioned above, monitoring device 104 is intended to be mounted to a vehicle's diagnostic port 102 and remain there during both operation of the vehicle and when the vehicle is not in use. Because a vehicle's OBD-II port may route power from the vehicle's battery to an attached device even when the vehicle is off, monitoring device 104 has more than one power mode, for example, a low power mode, an intermediate power mode, and a normal power mode to prevent battery drain when the vehicle is not in use. In general, the monitoring device 104 operates in the low and intermediate power modes when the vehicle is off and in the normal power mode when the vehicle is in use. Generally, while monitoring device 104 is in low power mode, power is limited or switched off to all components except for the sensor 116, and therefore, only the low-drain sensor 116 draws power from the vehicle's battery. In one embodiment, during low power mode, power may only be limited to computing device 110 rather than switched off, so that it may reside in a low-drain sleep state. While monitoring device 104 is in intermediate power mode, power is limited or switched off to all components except for computing device 110 and sensor 116. That is, both sensor 116 and computing device 110 are fully powered and active. While monitoring device 104 is in normal power mode, all components are fully powered, including the communication module 118. In the current embodiment, the accelerometer-based sensor 116 draws less than about 1 mA from the vehicle's battery during low power mode. In contrast, during normal power mode, monitoring device 104 may draw about 10 ma from the vehicle's battery, but may draw more or less depending on the specific components in monitoring device 104.

Additionally, in some embodiments, the specific sensors and components switched on (and thus drawing power) in the various power modes may be customizable to gain additional power savings. For example, if monitoring device includes two sensors, a user may configure the device such that only one remains powered in low power mode. In such a configuration, of monitoring device 104 may lose some sensitivity but may gain power efficiency. Further, in some embodiments, computing device 110 may periodically wake up during low power mode to write a time stamp to memory 112, as described in more detail below.

The monitoring device 104 transitions from low power mode to intermediate power mode based on feedback from the sensor 116. In the current embodiment, if the monitoring device 104 is in low power mode and accelerometer-based sensor 116 detects vibrations created by the opening of a vehicle door or created when a driver sits in the driver's seat, the sensor will send a signal (or interrupt) to the computing device 110, and monitoring device will transition to intermediate power mode. Once the monitoring device 104 is in intermediate power mode, the computing device 110 will be fully powered and will execute instructions to determine whether the vehicle's engine is running, and if it is, will instruct the monitoring device 104 to enter normal power mode. Alternatively, if the vehicle's engine is determined not to be running, the computing device 110 will perform a predetermined number of additional queries before returning the monitoring device 104 to low power mode. The computing device 110 will wait a predetermined interval of time between subsequent queries.

In one embodiment, to determine whether the engine is running, the computing device 110 will query the vehicle's data bus for the RPMs of the engine, and if the RPMs are reported as above zero, the computing device will flag the vehicle as operational and transition the monitoring device to normal power mode. In this manner, the monitoring device 104 will only draw a significant amount of power from the vehicle's battery while the vehicle's engine is running. Alternatively, the computing device 110 may query a different variable from the vehicle data bus to determine whether the vehicle's engine is running, or look to an entirely different aspect of the vehicle to determine whether to transition to normal power mode or return to low power mode. For example, if the monitoring device 104 is installed in a hybrid vehicle, the computing device may query the RPMs of the electric motor in addition to the RPMs of the gasoline engine. The process of transitioning between low power mode, intermediate power mode, and normal power mode is discussed in greater detail in association with FIG. 3.

In alternative embodiments, the monitoring device 104 may have a greater or fewer number of power modes. For example, in one embodiment, monitoring device 104 may only have two power modes—low power mode and normal power mode. In such an embodiment, when sensor 116 detects a factor indicative of the presence of a driver, monitoring device 104 will transition to normal power mode. Once in normal power mode, computing device 110 may query the vehicle's engine, and, if it is running, may remain in normal power mode, but, if it is not, may return to low power mode.

When operating in normal power mode, the monitoring device 104 collects vehicle data from the vehicle's data bus via the diagnostic port interface 108. Specifically, the computing device 110 requests selected vehicle data from the vehicle data bus and, upon receipt, processes and/or stores the data in the non-volatile memory 112. The monitoring device 104 may be configured to collect and store a myriad of vehicle data, including, but not limited to: total distance traveled, trip distance, minimum speed, maximum speed, trip minimum speed, trip maximum speed, current vehicle speed, engine revolutions per minute (RPM), electric motor RPMs, electric battery voltage, throttle position, emissions data, engine coolant temperature, intake air temperature, oxygen sensor voltage, fuel type, and fuel pressure. In an embodiment, the computing device 110 may timestamp the data using the real-time clock 114 before storing it in memory 112. Further, computing device 110 may perform calculations based on the gathered vehicle data and store the results in the memory 112.

In one embodiment, the monitoring device 104 includes a virtual odometer. The virtual odometer utilizes vehicle data, such as vehicle speed, to keep track of total mileage driven by the vehicle. In more detail, when the vehicle is running, and thus the monitoring device 104 is in normal power mode, computing device 110 will query the vehicle data bus for vehicle speed at uniformly spaced time intervals. Based on the collected speed values and the period of time between readings, the computing device 110 will calculate miles driven by the vehicle. The raw data and calculated mileage data may be stored in the memory 112. When the vehicle is not in use and the monitoring device 104 is in low power mode, the last virtual odometer reading remains saved in the memory 112. When the vehicle starts up again, and the monitoring device 104 transitions into normal power mode, the computing device 110 will query the last odometer reading from memory 112 and increment it accordingly. The virtual odometer is independent of the vehicle's odometer and will typically match or exceed the accuracy of the vehicle's odometer by using compensation techniques.

In addition to logging vehicle data while in normal power mode, the monitoring device 104 monitors the operational state of the vehicle to determine when to transition from normal power mode to low power mode. In the current embodiment, the computing device 110 executes instructions to periodically query the RPM value of the vehicle's engine. If the engine's RPMs are zero, the computing device 110 limits or switches off power to all the components of the monitoring device 104 except for the sensor 116. In an alternative embodiment, the computing device 110 queries a different vehicle parameter, such as voltage, to determine when to transition into low power mode. To accurately analyze and report vehicle data, monitoring device 104 must take into account periods of time when it is disconnected from a vehicle. In one embodiment, monitoring device 104 includes an anti-tamper system to accomplish this. The anti-tamper system utilizes the real-time clock 114, battery 115, computing device 110, and memory 112. In more detail, when monitoring device 104 is connected to an OBD-II port—regardless of whether the associated vehicle is running—computing device 110 will periodically query the real-time clock 114 for the time and, upon receiving it, will log the time to memory 112. When monitoring device 104 is in low power mode, computing device 110 will periodically wake up to log the time. If monitoring device 104 is disconnected from a vehicle, real-time clock will continue to keep the time using power from battery 115, however, computing device, lacking power, will not periodically write the time to memory 112. When monitoring device 104 is reconnected to a vehicle, the computing device 110 will begin logging the time again. To keep track of disconnected periods (an indication of tampering), when the computing device 110 reads a time value from real-time clock, it will compare it to the last timestamp in memory 112. If the time difference is determined to be substantial (e.g. more than 10 minutes), the computing device will document the tampering event and log the time difference. The computing device 110 may also adjust the virtual odometer based on the detected time difference. Further, in some embodiments, the monitoring device 104 may asynchronously send notice of a detected tampering event to remote systems via communications module 118.

In the monitoring system 106, the monitoring device 104 uses its communication module 118 to communicate with communication device 124 and/or network 126. In the latter case, the communication module 118 may connect directly to network 126 or may connect to network 126 in an ad-hoc manner using the communication device 124 as a gateway. In the current embodiment, communication device 124 utilizes a bi-directional Bluetooth channel to wirelessly communicate with monitoring device 104. Specifically, a user of the communication device 124 may remotely access the vehicle data, such as the virtual odometer, stored in the memory 112 of the monitoring device 104. Further, monitoring device 104 may also asynchronously push the logged vehicle data to the communication device 124 via the Bluetooth channel. Communication device 124 may include software to interpret and display the received vehicle data. Additionally, the communication device 124 may wirelessly connect to the monitoring device 104 and receive real-time vehicle data from the vehicle's diagnostic port 102. More specifically, computing device 110, in addition to logging the gathered vehicle data, may also directly pass the raw data to the communication module 118 for transmission to the communication device 124. Thus, using only the communication device 124, a mechanic or vehicle owner can easily monitor the state of the vehicle without removing the monitoring device 104 from the vehicle's diagnostic port 102. In an alternative embodiment, the communication module 118 may additionally communicate with the network 126 over a longer range wireless medium such as cellular or WiFi. In such a case, any network-connected computing device may have access to the vehicle data stored on or accessible through monitoring device 104. Additionally, in some embodiments, monitoring device 104 may periodically asynchronously transmit logged vehicle data, such as the current virtual odometer reading, to an external computing platform, server, or database connected to network 126.

Further, in some embodiments, monitoring device 104 may be configured to receive programming instructions or firmware instructions from external devices such as communication device 124. For example, communication device 124 may send, via the Bluetooth communication channel, an updated firmware file to monitoring device 104 to replace out-of-date firmware in computing device 110. Or, specific operating parameters of monitoring device 104 may be individually controlled from an external device. For instance, the communication device 124 may send a wireless signal to the monitoring device 104 altering the RPM value at which a vehicle's engine is deemed to be running or altering the number of times the computing device 110 will query the vehicle to determine if it is running upon entering intermediate power mode.

A person of ordinary skill in the art would recognize that the wireless communications between monitoring device 104, communication device 124, and network 126 discussed above may be replaced with wired connections without loss of functionality.

Figure 3:
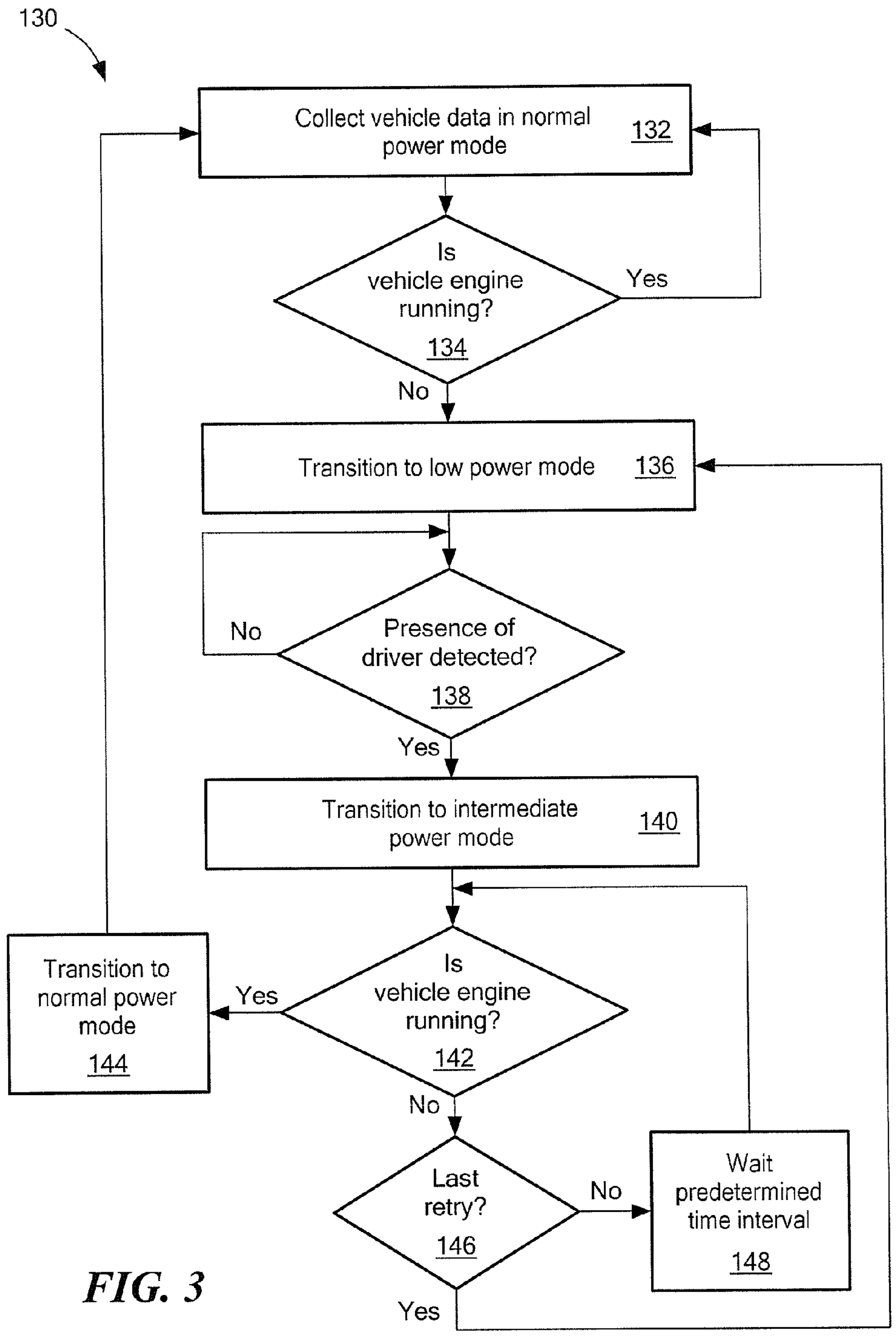
FIG. 3 is a high-level flowchart illustrating a method of transitioning the monitoring device of FIG. 1 between different power modes.

FIG. 3 is a high-level flowchart illustrating a method 130 of transitioning the monitoring device 104 between different power modes. Method 130 begins at block 132 where the monitoring device 104 collects vehicle data from the vehicle data bus while in normal power mode. At block 134, it is determined whether the vehicle's engine is running. Specifically, the computing device 110 executes instructions to query the RPM value of the engine. In alternative embodiments, for example if the vehicle is powered by an electric motor rather than a gasoline engine, the computing device may execute instructions to query values related to the electric motor or other values associated with an in-service vehicle. If the engine is running, method 130 returns to block 132 where monitoring device 104 continues to collect vehicle data. If the vehicle's engine is not running, method 130 proceeds to block 136 where the monitoring device 104 is transitioned to low power mode. As discussed above, in some embodiments, the sensor 116 may be the only component drawing power while the device 104 is in low power mode. At block 138, the sensor 116 listens for a factor indicating the presence of a driver in the vehicle. Specifically, in the exemplary embodiment, the accelerometer-based sensor 116 listens for vibrations resulting from driver ingress. While the factor indicating the presence of a driver is not detected, method 130 remains at block 138 and sensor 116 continues to monitor for the factor. If the factor indicating presence of a driver is detected, however, the sensor 116 sends an interrupt to computing device 110 and method 130 continues on to block 140 where the monitoring device 104 transitions to intermediate power mode. Method 130 then continues to block 142, where computing device 110 determines whether the vehicle's engine is running (or, alternatively, whether the vehicle's electric motor is spinning). If the vehicle's engine is running, method 130 continues to block 144 and then returns to block 132, where monitoring device 104 respectively transitions to normal power mode and then collects vehicle data. If instead, the vehicle's engine is not running, the method 130 proceeds to block 146 where it is determined whether the computing device 110 should make additional queries as to whether the vehicle's engine is running. If the predetermined number of subsequent queries has been reached, the method returns to block 136 where the monitoring device 104 transitions back to low power mode. If, instead, the predetermines number of subsequent queries has not been reached, method 130 proceeds to block 148 where computing device 110 waits for a predetermined time interval before returning to block 142 and querying the engine's state again.

One of ordinary skill in the art would recognize that even though FIG. 3 depicts a method in which monitoring device 104 transitions between three power modes, monitoring device 104 may have a fewer or greater number of power modes in other embodiments. Methods corresponding to those embodiments may include steps similar to those in method 130. For example, in an embodiment where monitoring device 104 has two power modes—low and normal—computing device 110 may query the vehicle's engine a predetermined number of times after transitioning to normal power mode while the vehicle's engine is found not to be running, and wait a predetermined time interval after each query.

The foregoing outlines features of selected embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure, as defined by the claims that follow.

What is claimed is:

1. A vehicle monitoring apparatus, comprising:

an interface configured to connect to a diagnostic port of a vehicle;

a processor coupled to the interface and configured to communicate with and collect vehicle data from the diagnostic port while an engine of the vehicle is running if the vehicle is stationary and if the vehicle is in motion;

a sensor coupled to the processor and configured to detect a factor indicating a presence of a driver in the vehicle, the sensor causing the apparatus to transition from a first power mode to a second power mode upon detection of the factor and from the second power mode to a third power mode if the engine is running, the apparatus drawing more power from the vehicle in the second power mode than in the first power mode and more power from the vehicle in the third power mode than in the second power mode, wherein the first power mode is representative of a low power mode, the second power mode is representative of an intermediate power mode, and the third power mode is representative of a full power mode; and a housing comprising the processor and the sensor.

2. The apparatus of claim 1, wherein the processor is further configured to query a state of the engine in the vehicle when the apparatus is in the second power mode, and transition the apparatus from the second power mode to the first power mode if the engine is not running.

3. The apparatus of claim 2, wherein the processor is further configured to query the state of an engine in the vehicle when the apparatus is in the second power mode, and transition the apparatus from the second power mode to the third power mode if the engine is running, the apparatus drawing more power from the vehicle in the third power mode than in the second power mode.

4. The apparatus of claim 3, wherein the processor is further configured to query the state of an engine in the vehicle when the apparatus is in the third power mode, and transition the apparatus from the third power mode to the first power mode if the engine is not running.

5. The apparatus of claim 3, further comprising:

a memory coupled to the processor;

software stored in the memory and executable by the processor to cause the monitoring apparatus to perform operations comprising:

detecting with the sensor the factor indicating the presence of a driver in the vehicle;

transitioning, upon detection of the factor, the apparatus from the first power mode to the second power mode;

querying a first time with the processor, after the transitioning from the first power mode to the second power mode, to determine whether an engine in the vehicle is running;

transitioning the monitoring apparatus from the second power mode to the third power mode if the querying determines that the engine is running;

waiting a predetermined time amount if the querying determines that the vehicle's engine is not running;

querying, after the waiting, a predetermined number of subsequent times to determine whether the vehicle's engine is running, and either transitioning the monitoring apparatus from the second power mode to the third power mode if a subsequent query determines that the engine is running, or waiting the predetermined time amount after the subsequent query if the subsequent query determines that the vehicle's engine is not running; and transitioning the monitoring apparatus from the second power mode to the first power mode if all of the subsequent queries determine that the vehicle's engine is not running.

6. The apparatus of claim 1, wherein the sensor comprises an accelerometer, the accelerometer drawing a negligible amount of power from the vehicle in the first power mode.

7. The apparatus of claim 1, further comprising:

a non-volatile memory coupled to the processor;

wherein the processor is further configured to selectively store the collected vehicle data in the memory.

8. The apparatus of claim 7, further comprising:

a clock coupled to the processor;

wherein the processor is configured to associate time values generated by the clock with the vehicle data.

9. The apparatus of claim 8, wherein the processor is configured to calculate a period of time the apparatus is disconnected from a vehicle using the time values generated by the clock.

10. The apparatus of claim 1, further comprising a communication module coupled to the processor, wherein the communication module is configured to communicate and exchange vehicle data with a receiver external to the monitoring apparatus.

11. The apparatus of claim 10, wherein the communication module is configured to communicate and exchange vehicle data with the receiver over a cellular connection, WiFi connection, Bluetooth connection, or other bi-directional channel.

12. A method, comprising:

monitoring a vehicle using a self-contained monitoring apparatus coupled to a diagnostic port of the vehicle, the monitoring comprising:

detecting, with a sensor in the monitoring apparatus, a factor indicating a presence of a driver in the vehicle;

transitioning the monitoring apparatus, upon detection of the factor, from a first power mode to a second power mode;

querying, after the transitioning from the first power mode to the second power mode, whether an engine in the vehicle is running;

transitioning the monitoring apparatus from the second power mode back to the first power mode if the querying determines that the engine is not running; and transitioning the monitoring apparatus from the second power mode to a third power mode if the querying determines that the engine is running; and drawing, with the monitoring apparatus, a greater amount of power from the vehicle in the second power mode than in the first power mode and a greater amount of power from the vehicle in the third power mode than in the second power mode, wherein the first power mode is representative of a low power mode, the second power mode is representative of an intermediate power mode, and the third power mode is representative of a full power mode, wherein the monitoring apparatus is configured to communicate with and collect vehicle data from the diagnostic port while an engine of the vehicle is running if the vehicle is stationary and if the vehicle is in motion.

13. The method of claim 12, further comprising:

querying, when the monitoring apparatus is in the third power mode, whether an engine in the vehicle is running; and transitioning the monitoring apparatus from the third power mode to the first power mode if the querying determines that the engine is not running.

14. The method of claim 12, further comprising:

waiting a predetermined time amount if the querying determines that the vehicle's engine is not running;

querying, after the waiting, a predetermined number of subsequent times to determine whether the vehicle's engine is running, and either transitioning the monitoring apparatus from the second power mode to the third power mode if a subsequent query determines that the engine is running, or waiting the predetermined time amount after the subsequent query if the subsequent query determines that the vehicle's engine is not running; and transitioning the monitoring apparatus from the second power mode to the first power mode if all of the subsequent queries determine that the vehicle's engine is not running.

15. The method of claim 12, wherein the sensor comprises an accelerometer; and wherein the detecting a factor indicating the presence of a driver in the vehicle includes detecting motion with the sensor.

16. The method of claim 12, further comprising:

communicating with and collecting vehicle data from the diagnostic port, the monitoring apparatus operating in the second or third power modes during the communicating and collecting;

storing, with a processor in the monitoring apparatus, the vehicle data in a memory coupled to the processor.

17. The method of claim 16, further comprising: transmitting with a communication module in the monitoring apparatus, at least some of the vehicle data to a receiver external to the monitoring apparatus.

18. The method of claim 16, further comprising: maintaining, with the processor, the memory, and a clock in the monitoring apparatus, a virtual odometer based on the vehicle data.

19. The method of claim 16, further comprising: logging, with the processor, the memory, and a clock in the monitoring apparatus, periods of time during which the monitoring apparatus is disconnected from a vehicle.

20. The method of claim 18, including transmitting, with a communication module in the monitoring apparatus, a value of the virtual odometer to a receiver external to the monitoring apparatus.

21. The apparatus of claim 10, wherein the receiver is one or more of a smart phone, personal digital assistant (PDA), tablet personal computer (PC), laptop PC, or desktop PC.

22. The apparatus of claim 10, wherein the receiver is a network.

23. The apparatus of claim 1, wherein the diagnostic port is an onboard diagnostic port.

24. The apparatus of claim 23, wherein the onboard diagnostic port is an Onboard Diagnostic Port II (OBD-II).

25. The apparatus of claim 23, wherein the vehicle data collected from the onboard diagnostic port comprises one or more of data associated with total distance traveled with the vehicle, distance traveled with the vehicle over a given time interval, minimum vehicle speed, maximum vehicle speed, current vehicle speed, engine revolutions per minute (RPM), electric motor RPMs, electric battery voltage, throttle position, emissions data, engine coolant temperature, intake air temperature, oxygen sensor voltage, fuel type, fuel pressure, driver statistics, vehicle operation, vehicle health, or other available onboard diagnostic data.

26. The apparatus of claim 1, wherein the interface is removable from the diagnostic port and the apparatus is operable to detect said removal from the diagnostic port.

27. The apparatus of claim 1, wherein the communicating with and collecting vehicle data from the diagnostic port occurs without user interaction.

28. The apparatus of claim 1, wherein the sensor is alternately or further configured to detect a factor indicating that the vehicle is in motion, wherein the factor indicating that the vehicle is in motion may be combined with or alternatively replace the factor indicating the presence of the driver, wherein the sensor causes the apparatus to transition from the first power mode to the second power mode upon detection of one or more of the factor indicating that the vehicle is in motion and the factor indicating the presence of the driver.

29. The apparatus of claim 1, wherein the sensor is capable of detecting the factor indicating the presence of a driver in the vehicle if the engine is running and if the engine is not running.

30. The apparatus of claim 1, wherein while the apparatus is operating in the first power mode, power is only provided to the sensor.

31. The apparatus of claim 1, wherein while the apparatus is operating in the second power mode, power is only provided to one or more of the sensor and processor.

32. The apparatus of claim 1, wherein the vehicle data is collected in the second and third power modes.

* * * * *